United States Patent

Lemos et al.

[11] Patent Number: 6,153,673
[45] Date of Patent: Nov. 28, 2000

[54] PHOSPHOMAGNESIUM CEMENT COMPOUND COMPRISING A POLYMER IN PARTICLE FORM

[75] Inventors: Dominique Lemos, Pantin; Gilles Orange, Soisy Sous Montmorency; Jean-Francois Colombet, Rueil Malmaison, all of France

[73] Assignee: Rhodia Chimie, Courbevoie Cedex, France

[21] Appl. No.: 09/180,876

[22] PCT Filed: May 23, 1997

[86] PCT No.: PCT/FR97/00904

§ 371 Date: Feb. 16, 1999

§ 102(e) Date: Feb. 16, 1999

[87] PCT Pub. No.: WO97/45380

PCT Pub. Date: Dec. 4, 1997

[30] Foreign Application Priority Data

May 24, 1996 [FR] France ................................. 96 06461

[51] Int. Cl.[7] .................................................. C04B 24/26
[52] U.S. Cl. ................................. 524/5; 524/4; 106/823
[58] Field of Search ............................ 524/4, 5; 106/823

[56] References Cited

U.S. PATENT DOCUMENTS

| | | | |
|---|---|---|---|
| 4,271,057 | 6/1981 | Drake et al. ........................ | 524/5 |
| 5,079,277 | 1/1992 | Wilson et al. ..................... | 524/5 |
| 5,218,035 | 6/1993 | Liu ....................................... | 524/5 |
| 5,518,541 | 5/1996 | Fogel et al. ....................... | 106/823 |
| 5,595,597 | 1/1997 | Fogel et al. ....................... | 106/823 |
| 5,718,757 | 2/1998 | Guillou et al. .................... | 106/823 |
| 5,953,659 | 8/1999 | Cane et al. ........................ | 427/428 |

FOREIGN PATENT DOCUMENTS 0 661 242   7/1998   European Pat. Off. .

OTHER PUBLICATIONS

Grant & Hackh's Chemical Dictionary Fifth Edition, p. 619, 1987.
Chemical Abstracts, vol. 108, No. 8, Feb. 22, 1988, Columbus, Ohio, US; Abstract No. 61454w, XP000157811.
Chemical Abstracts, vol. 121, No. 10, Sep. 5, 1994, Columbus, Ohio, US; Abstract No. 116087, Okamoto, Misao et al, "Porous materials having high strength and excellent heat insulating property and their manufacture" XP002025228.
Chemical Abstracts, vol. 112, No. 6, Feb. 5, 1990, Columbus, Ohio, US; Abstract No. 41546g, XP000154640.
Chemical Abstracts, vol. 93, No. 18, Nov. 3, 1980, Columbus, Ohio, US; Abstract No. 172649e, XP000185424.

*Primary Examiner*—Peter A. Szekely
*Attorney, Agent, or Firm*—Burns, Doane, Swecker & Mathis, L.L.P.

[57] ABSTRACT

The invention discloses a new phosphomagnesium cement that can be obtained by contacting at least one phosphorus compound and at least one magnesium compound based binder phase, with at least one polymer in water insoluble particle form, and water. The polymer can be selected among those derived from the polymerisation of at least one ethylenically unsaturated monomer and at least one monomer selected among monomers with carboxylic function and acrylamide or methacrylamide. The phosphomagnesium cement can also comprise an aminoalkylsilane, preferably an aminoalkyl(alkoxysilane).

22 Claims, No Drawings

PHOSPHOMAGNESIUM CEMENT COMPOUND COMPRISING A POLYMER IN PARTICLE FORM

The present invention relates to a novel phosphomagnesium cement composition.

Phosphomagnesium cements are hydraulic binders, i.e. binders which solidify in the presence of water. They are characterized by a binding phase based on at least one phosphorus compound and at least one magnesium compound.

Phosphomagnesium cements are particularly advantageous for their rapid setting and their high mechanical properties. In addition, they can be used in contact with acid media.

However, these cements lack flexibility: their modulus of elasticity is often high. This is a drawback when, for example, the cement is used to cover a support which, when subjected to various stresses, moves and undergoes deformations. If the coating based on phosphomagnesium cement lacks flexibility, it cracks and splits.

It has also been observed that, under conditions of high humidity, these cements can have poor durability, in particular poor resistance to dry/wet or frost/thaw cycles.

The object of the present invention is thus to propose a phosphomagnesium cement which has a low modulus of elasticity, while at the same time retaining its advantageous properties, such as high mechanical properties or use in acid media.

The aim of the invention is also to propose a water-repellent phosphomagnesium cement which is thus relatively insensitive to wet conditions.

With this aim, the invention relates to a phosphomagnesium cement which can be obtained by placing a binding phase, based on at least one phosphorus compound and on at least one magnesium compound, in contact with at least one polymer in the form of water-insoluble particles, and water.

The invention also relates to the process for preparing this phosphomagnesium cement, which consists in placing in contact the phosphorus and magnesium compounds, at least one polymer in the form of water-insoluble particles, and water.

Other advantages of the invention will become more apparent on reading the description and the examples.

The invention relates firstly to a phosphomagnesium cement which can be obtained by placing a binding phase, based on at least one phosphorus compound and on at least one magnesium compound, in contact with at least one polymer in the form of water-insoluble particles, and water.

Conventionally, cements consist of a binding phase comprising, where appropriate, the usual additives in the field. Although a different term is used to define cements comprising granulates, besides the said binding phase and any additives, the single term "cement" will be used for greater convenience in the description, to refer to these two types of compositions.

The cement according to the invention is a phosphomagnesium cement. The binding phase of such a cement thus comprises a phosphorus-based first constituent and a magnesium-based second constituent.

As regards the phosphorus-based first constituent, any phosphorus compound can be used provided that it comprises phosphorus pentoxide, which is available directly or in the form of a precursor.

Thus, as phosphorus-based compound, mention may be made, without wishing to be limiting, of phosphorus pentoxide, phosphoric acid or derivatives such as orthophosphoric acid, pyrophosphoric acid or polyphosphoric acid, or alternatively salts of such acids, such as the phosphates, hydrogenphosphates, orthophosphates, pyrophosphates, polyphosphates, tripolyphosphates or tetrapolyphosphates of aluminium, of calcium, of potassium, of magnesium or of ammonium, or of mixtures thereof.

It should be noted that phosphorus-containing rejects in the fertilizer manufacturing industries, or alternatively in steel works (stripping of steel, anticorrosion treatment), can be used as phosphorus-based constituents.

According to one specific embodiment of the invention, salts of the phosphorus-based acids mentioned above are used.

Preferably, phosphates or hydrogenphosphates of potassium, of magnesium or of ammonium, or mixtures thereof, are used. Even more preferably, the phosphorus-based constituent is ammonium dihydrogenphosphate, optionally mixed with ammonium tripolyphosphate.

The phosphorus-based constituent can be in liquid form or, preferably, in solid form.

According to a first variant, the phosphorus-based constituent is in the form of particles with a particle size more particularly of not more than 300 $\mu$m. It should be noted that this value is not critical and that if it is possible to use constituents with a particle size of greater than 300 $\mu$m, grinding before incorporation into the composition according to the invention may be desirable. This grinding can improve the dissolution kinetics of the phosphorus-based constituent.

According to a second variant, the constituent is used in a form adsorbed onto a porous support. As supports, mention may be made, for example, of diatomaceous earths, clay, bentonite, silica or alumina. The adsorption is carried out in a manner which is known per se. Thus, conventionally, the phosphorus-based constituent, in solution or in suspension, is placed in contact with the support, with stirring, and the resulting suspension is then heated so as to evaporate the excess of liquid. This operation can likewise be carried out by impregnating the support in a drum or on a rotating disc.

The second component of the binding phase is at least one magnesium-based constituent.

Any magnesium-based compound is suitable for the present invention provided that it reacts with the first constituent, in the presence of water.

As examples, the following constituents may be mentioned as being suitable for carrying out the invention: magnesium oxide, magnesium hydroxide, magnesium carbonate.

Preferably, a constituent based on magnesium oxide is used. The so-called "dead burned" magnesia usually obtained after calcination of magnesium carbonate at temperatures above 1200° C. is especially suitable.

Advantageously, the said magnesium oxide can be used in a pure form or can optionally comprise at least one element such as calcium, silicon, aluminium or iron; these elements are generally found in oxide or hydroxide form. As an example of a compound of this type, mention may be made of dolomite, which is a mixture in particular comprising magnesium oxide and calcium oxide.

If magnesium oxide is used in pure form, the purity of the said oxide is at least 80%.

A magnesium-based constituent whose specific surface is less than 10 $m^2/g$ is preferably used. More particularly, the specific surface is less than 2 $m^2/g$.

Moreover, the particle size of the said constituent is usually between 10 and 500 $\mu$m. It would be possible to envisage using compounds whose particle size is outside the abovementioned range, although this does not provide any particular advantages. Thus, if the particle size is greater than 500 μm, a grinding step prior to the incorporation into the composition may be necessary. Moreover, if the particle size of the said constituents was less than 10 μm, a change in the properties of the composition placed in contact with water might be observed. It is possible to observe, in particular, an increase in the setting rate of the cement, unless the content of setting-retardant agent is increased, which will be discussed in the description hereinbelow. Accordingly, the cement obtained according to the process of the invention might be less advantageous in terms of implementation or cost-effectiveness.

It should be noted that if they are in solid form, the two constituents described above can optionally be subjected to a grinding step before being used in the process according to the invention.

The proportion of the magnesium-based constituent (expressed as weight of MgO) relative to that of the phosphorus-based constituent (expressed as weight of $P_2O_5$) is more particularly between 1 and 3.

The essential characteristic of the cement according to the invention is that it can be obtained by placing the binding phase described above in contact with at least one additive chosen from polymers in the form of water-insoluble particles, and water.

Any type of polymer in the form of water-insoluble particles can be used, and in particular those derived from the polymerization of monomers containing ethylenic unsaturation.

The monomers can be chosen from:

styrene, butadiene, acrylic esters and vinyl nitriles, acrylic esters, i.e. esters of acrylic acid and of methacrylic acid with $C_1$–$C_{12}$ alkanols, preferably $C_1$–$C_8$ alkanols, such as methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate, vinyl nitriles having from 3 to 12 carbon atoms, in particular acrylonitrile and methacrylo-nitrile, α-methylstyrene or vinyltoluene, vinyl esters of carboxylic acid, such as vinyl acetate, or vinyl propionate, ethylenic unsaturated mono- and dicarboxylic acids such as acrylic acid, methacrylic acid, itaconic acid, maleic acid and fumaric acid, and monoalkyl esters of dicarboxylic acids of the type mentioned with alkanols preferably having 1 to 4 carbon atoms, and N-substituted derivatives thereof, unsaturated carboxylic acid amides such as acrylamide, methacrylamide, N-methalolacrylamide or -methacrylamide, ethylenic monomers containing a sulphonic acid group and its alkali metal or ammonium salts, for example vinylsulphonic acid, vinylbenzenesulphonic acid, α-acrylamidomethylpropanesulphonic acid or 2-sulphoethylene methacrylate, ethylenically unsaturated monomers containing a secondary, tertiary or quaternary amino group or a heterocyclic group containing nitrogen, for example vinylpyridines, vinylimidazole, aminoalkyl (meth) acrylates and aminoalkyl(meth)acrylamides such as dimethylaminoethyl acrylate or methacrylate, di-tert-butylaminoethyl acrylate or methacrylate, dimethylaminomethylacrylamide or -methacrylamide, as well as zwitterionic monomers such as sulphopropyl (dimethyl)aminopropyl acrylate, etc., esters of (meth)acrylic acids with alkanediols preferably containing 2–8 carbon atoms, such as glycol mono (meth)acrylate, hydroxypropyl mono(meth)acrylate or 1,4-butanediol mono(meth)acrylate, as well as monomers containing two polymerizable double bonds, such as ethylene glycol dimethacrylate, glycidyl (meth)acrylate, vinylsilanes and acrylic silanes.

According to a first preferred mode, the polymer used in the cement according to the invention is obtained from the polymerization of at least one monomer containing ethylenic unsaturation and at least one monomer chosen from monomers containing a carboxylic function and acrylamide or methacrylamide.

In this case, the monomer containing ethylenic unsaturation can be chosen from: styrene, butadiene, acrylic or methacrylic esters of $C_1$–$C_{12}$ alkyl and their corresponding acids, or vinyl esters. It can be, advantageously, a water-insoluble polymer prepared from a styrene/butadiene mixture as regards the monomers containing ethylenic unsaturation.

As regards the monomer containing a carboxylic function, it can be chosen from carboxylic acids containing ethylenic unsaturation. It can be chosen, for example, from acrylic acid, itaconic acid, fumaric acid, crotonic acid, maleic acid, maleic anhydride, mesaconic acid and glutaconic acid, or mixtures thereof.

According to this first mode, the polymers most particularly preferred are those prepared from a mixture of monomers containing 99.9 to 92% by weight of at least one monomer containing ethylenic unsaturation and 0.1 to 8% by weight, preferably 2 to 5%, of at least one monomer containing a carboxylic function.

According to another preferred mode, the polymer is obtained from the polymerization of at least one monomer chosen from vinyl esters of carboxylic acid, such as vinyl acetate, vinyl versatate or vinyl propionate. It can be, in particular, a vinyl versatate/vinyl acetate copolymer.

The polymer in the form of water-insoluble particles, used as an additive in the composition of the cement according to the invention, can be obtained by emulsion polymerization of the monomers. Such a polymerization is usually carried out in the presence of an emulsifier and a polymerization initiator.

The monomers can be introduced as a mixture or separately and simultaneously into the reaction medium, either before the start of the polymerization in a single portion, or during the polymerization in successive fractions or continuously.

Conventional anionic agents represented in particular by fatty acid salts, alkylsulphates, alkylsulphonates, alkylarylsulphates, alkylaryl-sulphonates, arylsulphates, arylsulphonates, sulphosuccinates and alkylphosphates of alkali metals are generally used as emulsifiers. They are used in a proportion of from 0.01 to 5% by weight relative to the total weight of the monomers.

The emulsion polymerization initiator, which is water-soluble, is represented more particularly by hydroperoxides such as hydrogen peroxide or tert-butyl hydroperoxide and by persulphates such as sodium persulphate, potassium persulphate or ammonium persulphate. It is used in amounts of between 0.05 and 2% by weight relative to the total weight of the monomers. These initiators are optionally combined with a reducing agent, such as sodium bisulphite or formaldehydesulphoxylate, polyethyleneamines, sugars:

dextrose, sucrose, metal salts. The amounts of reducing agent used range from 0 to 3% by weight relative to the total weight of the monomers.

The reaction temperature, which depends on the initiator used, is generally between 0 and 100° C., and preferably between 50 and 80° C.

A transfer agent can be used in proportions ranging from 0 to 3% by weight relative to the monomer(s), this agent generally being chosen from mercaptans such as n-dodecyl mercaptan, tert-dodecyl mercaptan and tert-butyl mercaptan, or esters thereof such as methyl mercaptopropionate; cyclohexene; halohydrocarbons such as chloroform, bromoform or carbon tetrachloride.

The polymer can be introduced into the mixture in various forms.

According to a first variant, the polymer is in the form of a dispersion of polymer particles in water. This is commonly referred to as a latex. Such latices are obtained by the process as defined above. The value of their solids content is not critical. It is generally about 50% by weight.

The size of the particles in the latex obtained from the polymerization of monomers containing ethylenic unsaturation and of monomers containing a carboxylic function can be between 0.05 and 5 $\mu$m, preferably between 0.12 and 0.18 $\mu$m and even more preferably between 0.10 and 0.20 $\mu$m. The size of the particles in the latex obtained from the polymerization of carboxylic acid vinyl ester monomers is generally between 1 and 2 $\mu$m.

According to a second variant, the polymer is in the form of a powder which can be redispersed in water.

Such a powder can be obtained by any method known to those skilled in the art, in particular by removal of water from a latex.

The water in a latex can be removed, for example, by freezing and then sublimation or freeze-drying.

The water can also be removed by drying, in particular by spray-drying, in the presence of anticaking additives or dispersion additives which will ensure redispersion of the powder in the water.

An inorganic filler with a particle size of less than about 20 $\mu$m can be used as anticaking additive. It can be, for example, silica, calcium carbonate, kaolin, barium sulphate, titanium oxide, talc, hydrated alumina, bentonite or calcium sulphoaluminate (satin white).

Various products can be used as dispersion additives, depending on the nature of the latex to be dried.

When the latex is obtained from the polymerization of monomers containing ethylenic unsaturation and of monomers containing a carboxylic function, the dispersion additive can be an amino acid or an amino acid salt. In this case, the amino acid is preferably chosen from:

monoamino monocarboxylic acids, or monoamino dicarboxylic acids, or diamino monocarboxylic acids.

The monoamino monocarboxylic acids can be chosen in particular from glycine, alanine, leucine and phenylalanine, the monoamino dicarboxylic acids can be chosen from aspartic acid, glutamic acid and hydroxyglutamic acid, and the diamino monocarboxylic acids can be chosen from arginine, lysine, histidine and cystine.

The amino acids present in the polymer powder advantageously have good water-solubility and can consequently be in the form of salts, and in particular water-soluble or water-alkali-soluble salts. They can be, for example, sodium, potassium, ammonium or calcium salts.

When the latex is obtained from the polymerization of carboxylic acid vinyl ester monomers, the dispersion additive is generally a polyvinyl alcohol.

In general, the polymer is introduced into the cement mixture in an amount such that its content is from 0.5 to 30 parts by weight per 100 parts by weight of binding phase. The water-repellent effect of the phosphomagnesium cement appears even if the polymer is present in a small amount in the cement: 0.5 to 5 parts by weight of polymer per 100 parts by weight of binding phase are sufficient. In order to improve the modulus of elasticity of the phosphomagnesium cement, the best results are obtained when the polymer content is between 10 and 20 parts by weight per 100 parts by weight of binding phase.

According to a preferred mode of the invention, the cement can be obtained by placing the binding phase described above in contact with at least one water-insoluble polymer and also at least a second additive chosen from aminoalkylsilanes, and water.

In point of fact, it is possible to observe, during the introduction of the polymer into the cement composition according to the invention, an entrainment of air which can lead to a porous final material and to poor mechanical properties. The introduction of an aminoalkylsilane avoids this phenomenon.

Preferably, the aminosilane is an aminoalkyl-(ethoxysilane).

It can particularly be aminoalkyl-(trialkoxysilanes) of formula: $R^1R^2N-(CH_2)_n-Si(OC_mH_{2m+1})_3$ with:

n>1, preferably n>3 m>1

$R^1$ and $R^2$ being alkyl, aryl, alkylaryl, alkylene or aminoalkyl groups.

It can be, for example: γ-aminopropyltriethoxysilane, 4-aminobutyltriethoxysilane, (aminoethylaminomethyl) phenethyltrimethoxysilane, N-(2-aminoethyl-3-aminopropyl)trimethoxysilane, ω-aminoundecyltrimethoxysilane.

The preferred aminoalkyl(alkoxysilane) is γ-aminopropyltriethoxysilane.

In general, the aminoalkylsilane is introduced into the cement mixture in an amount such that the aminoalkylsilane content is from 0.05 to 2 parts by weight per 100 parts by weight of binding phase, preferably from 0.1 to 1.

The aminoalkylsilane can be introduced directly into the composition in its pure form. It can also be predeposited or preabsorbed onto constituent components of the cement, for example such as the magnesium compounds, and can be introduced via these components into the composition according to the invention.

A defoaming agent such as, for example, DEHYDRAN 1922, (mixture of surface active and mineral substances, containing no silicones) sold by the company Henkel can also be used, with or in place of the aminoalkylsilane, in a proportion of from 0.5 to 1 part by weight per 100 parts by weight of binding phase.

The binding phase for the cement according to the invention can also comprise any type of additive conventionally used, in particular a setting-retardant agent.

More particularly, this agent is chosen from compounds capable of complexing magnesium.

These compounds can be, in particular, carboxylic acids such as citric acid, oxalic acid or tartaric acid, boron-containing acids, esters or salts, phosphorus-containing acids, esters or salts, such as sodium tripolyphosphate, ferrous sulphate, sodium sulphate or lignosulphate, zinc chloride, copper acetate, sodium gluconate, sodium cellulose sulphate acetate, the product of reacting formaldehyde with aminolignosulphate, dialdehyde starch, N,N-dimethyloldihydroxyethyleneurea, silicofluorides, tall oil and sucrose, these compounds being taken alone or as a mixture.

Use is preferably made, alone or as a mixture, of carboxylic acids, and preferably, boron-containing acids, esters or salts.

Thus, in this last category of compounds, mention may be made, without wishing to be limiting, of boric acid and its salts, such as the alkali metal salts, for instance the sodium salt (borax), amine salts or ammonium salts. Boric acid esters, such as trialkyl oxyborates or triaryl oxyborates, are also suitable for carrying out the invention.

According to one specific mode, the additive is used in the form of a powder whose average diameter is from 10 to 200 µm.

The amount of setting-retardant agent ranges between 0 and 10 parts by weight per 100 parts by weight of binding phase. Preferably, this amount is between 0 and 5 parts by weight relative to the same reference.

The cements obtained by the mixture according to the invention can also comprise granulates as constituent components.

As examples of such compounds, mention may be made of sand, silica, alumina, zirconium oxide, crude dolomite, chromium ore, limestone, clinker, vermiculite, perlite and kaolinite. Fly-ash and condensed silica fume can likewise be used.

The fly-ash which can be used is generally silicoaluminous ash obtained from combustion in thermal power stations in particular.

The particle size of this ash is usually between 0.5 and 200 µm.

The condensed silica fume, which is optionally a constituent of the composition according to the invention, generally has a specific surface of between 20 and 30 m$^2$/g.

Depending on the subsequent application of the cement, the granulates forming part of the composition will be chosen either from sand, silica or the other compounds mentioned, or from fly-ash or condensed silica smoke, or from a mixture of these two types of granulates.

Usually, the amount of granulates in the cement according to the invention is not more than 1000 parts by weight per 100 parts by weight of binding phase.

According to one specific embodiment, the amount of sand, silica or other compounds mentioned in this list is generally between 0 and 900 parts by weight relative to the same reference as above. Furthermore, the amount of condensed silica fume or of fly-ash is between 0 and 100 parts by weight.

The cement according to the invention can moreover comprise a water-repellant agent as additive.

Lastly, the cement according to the invention can comprise any conventional additive, such as fluidifying agents, with, in particular, sodium lignosulphonate and condensates of naphthalenesulphonate, naphthalene, sodium tripolyphosphate, sodium hexametaphosphate, ammonium hydrogenphosphate, melanin or alkyl siliconates.

Antifoaming agents can likewise be constituent components of the cement according to the invention. By way of example, mention may be made in particular of polydimethylsiloxane-based antifoaming agents.

Among the agents of this type, mention may be made in particular of silicones in the form of a solution, a solid and, preferably, in the form of a resin, an oil or an emulsion, preferably, in water. Silicones essentially comprising units M ($RSiO_{0.5}$) and D ($R_2SiO$) are most particularly suitable. In these formulae, the radicals R, which may be identical or different, are chosen more particularly from hydrogen and alkyl radicals comprising 1 to 8 carbon atoms, the methyl radical being preferred. The number of units is preferably between 30 and 120.

The amount of silicone used in the cement according to the invention is less than or equal to 10 parts by weight per 100 parts by weight of binding phase, and preferably less than or equal to 5 parts by weight.

In general, such additives do not represent more than 10 parts by weight per 100 parts by weight of binding phase. Preferably, the amount of additives is between 0 and 5 parts by weight.

The cement according to the invention can also comprise, as additive, an inorganic compound introduced in the form:
- either of particles (1) less than 0.1 µm in size,
- or of aggregates (2) less than 0.1 µm in size,
- or of agglomerates (3) which can at least partially disintegrate, during mixing of the said binding phase and water, into particles less than 0.1 µm in size or into aggregates less than 0.1 µm in size.

According to a first variant, the inorganic compound is introduced into the cement in the form of particles (1) less than 0.1 µm in size. The term particles (1) is understood to refer to indivisible objects in a unitary, unified form.

According to a second variant, the inorganic compound is introduced into the cement in the form of aggregates (2). The term aggregates (2) is understood to refer to objects formed from stacking several smaller objects, which are themselves in a unitary, unified form, such as the particles defined above. The aggregates introduced are less than 0.1 µm in size. These aggregates are generally very difficult to divide, and in particular are indivisible in a mixture of the magnesium and phosphorus compounds and water.

According to a third embodiment, the inorganic compound is introduced in the form of agglomerates (3). The term agglomerates (3) is understood to refer to objects formed from stacking several smaller objects: particles and/or aggregates. According to the invention, the agglomerates introduced must be able to at least partially disintegrate by mixing with the magnesium and phosphorus compounds and water, into their constituent objects (particles or aggregates), in order to give objects smaller than 0.1 µm in size in the mixture.

The inorganic compound can be introduced as a mixture of these three forms (particles, aggregates and agglomerates).

In the text, the term size is understood to refer to the average size of the particles, aggregates or agglomerates. This size is measured by transmission electron microscopy (TEM).

Preferably, the inorganic compound is introduced in the form of agglomerates not more than 60 µm in size, advantageously not more than 20 µm in size. Such an agglomerate size allows easier handling of the inorganic compound.

The inorganic compound can be chosen from $SiO_2$, $TiO_2$, $Al_2O_3$, $ZrO_2$, $Cr_2O_3$, $CaCO_3$, talc, mica, kaolin, wollastonite, bentonite and metakaolin. They can be crystalline or amorphous compounds obtained, for example, by grinding.

It can especially be silica, and in particular precipitation silica.

The silica introduced can advantageously be in the form of agglomerates with an average size of less than 50 Am, the said agglomerates consisting of aggregates with an average size of less than 0.1 µm.

It can be, for example, the precipitated silica T38AB sold by Rhone-Poulenc in the form of agglomerates less than 50 µm in size. These agglomerates break down in the mixture of binding phase and water in the form of aggregates less than 0.1 µm in size. These aggregates are formed of elementary particles 15 nm in size and are indivisible in the binding phase/water mixture.

Ground-fumed silica or pyrogenic silica can also be used.

The content of inorganic compound in the cement according to the invention is generally between 1 and 15 parts by weight per 100 parts of the binding phase, preferably between 1 and 10 parts.

The amount of water to be introduced in order to prepare the cement according to the invention is such that a plastic, homogeneous, malleable paste is obtained. This amount depends on the subsequent application of the cement since, if it is desired to make pipe linings, the composition is generally more cohesive than a cement intended to make a floor covering or for the preparation of slabs or panels.

In general, the water content is less than 50% by weight, preferably between 30 and 40%, relative to the weight of binding phase.

Mixing of the binding phase and the water can be carried out according to any suitable method. Thus, the process can be performed by supplying all the constituent components of the cement, and the water, simultaneously or separately. According to this last possibility, a composition is generally prepared comprising the binding phase, the granulates, a retardant where appropriate, and all or some of the generally solid, optional additives mentioned above, in particular the polymer when it is in powder form. The said composition is then mixed with water, this water comprising, as appropriate, the components not introduced in the previous step for preparing the composition, such as the liquid additives, and in particular the polymer, if it is in latex form, or the aminoalkylsilane.

It should be noted that it can also be envisaged to use more or less complete mixtures of the constituent components of the cement, from the mixing of the components at the time of application to the use of mixtures for which only water needs to be added.

The essential feature of the process is that it is carried out so as to obtain the most homogeneous distribution possible of all of the constituent components in the mass of the cement.

The constituent components are mixed by any known means and preferably under shear conditions, for example using a mixer.

The mixing operation is advantageously carried out at a temperature close to ambient temperature.

The invention also relates to the process for preparing the phosphomagnesium cement as described above, in which the phosphorus and magnesium compounds, at least one polymer in the form of water-insoluble particles, optionally at least one aminoalkylsilane, and water are placed in contact.

The examples which follow illustrate the invention without, however, limiting its scope.

EXAMPLES

Methods for Controlling the Characteristics of the Cement

Measurement of the Workability (or slump)

The workability is measured using a vibrator table on standardized mortar, according to NFP standard 15403. The mortar is introduced into a frustoconical mould and is then removed from the mould and shaken using the vibrator table (15 shaking-blows in 15 s). The workability is the ratio of the diameter of the frustoconical mould to that of the mortar after collapse. It is expressed as a percentage.

Measurement of the Mechanical Properties in Compression and Flexure

Prismatic test pieces (4×4×16 cm$^3$) are produced by casting the mortar or the grout in standard mild steel moulds using an impact table (60 impacts). These test pieces are removed from the moulds 24 hours after the setting time and are dried at 23° C. and at a relative humidity of 50%. The mechanical properties are tested on these test pieces.

The tests are carried out in three-point flexure (NFP 18407) on three test pieces and in compression (NFP 15451) on six half-test pieces, using a hydraulic testing machine (200 kN).

Measurement of the Modulus of Elasticity

A prismatic test piece (4×4×16 cm$^3$) is produced by casting the mortar or the grout in standard mild steel moulds using an impact table (60 impacts). The modulus of elasticity is obtained by vibrating the test piece on two bearings and measuring the fundamental frequency using a Grindosonic machine.

Measurement of the Density

The density is measured on the fresh cement, after mixing, by weighing in a given volume.

Measurement of the Occluded Air

The occluded air is measured on the fresh mortar using a 1-litre aerometer, according to DIN standard 1164.

Measurement of the Water-repellency Properties

A prismatic test piece (4×4×16 cm$^3$) is produced. It is removed from the mould 24 hours later and is stabilized for 6 days in a conditioned room (23° C., 50% humidity). It is then weighed.

The test piece is then placed vertically in a container containing an amount of water such that a small part of the test pieces is immersed (immersed length: 2 to 3 mm).

The water-repellency is evaluated by the capillary absorption, which is monitored by the increase in mass ($\Delta m$) of the test piece.

Comparative Example 1

Standard Phosphomagnesium Mortar

A phosphomagnesium mortar is prepared from the following constituents:

25% of binding phase consisting of:
    50% by weight of monoammonium phosphate,
    50% by weight of magnesium oxide,
  75% of CEN 31 196-1 standardized sand of natural origin (Leucate) consisting of a mixture of fine (0/1 mm), medium (1/1.6 mm) and coarse (1/6.2 mm) components.

A mortar with a water/binding phase mass ratio equal to 0.38 is prepared by mixing the materials defined above with water. Mixing is carried out using a Perrier mortar mixer, following the standardized mixing cycle according to AFNOR standard NF P15-411 in the following way. The materials in dry form are mixed for 30 s at low speed (60 rpm), the water is then introduced therein in the desired proportion and mixing is continued for 2 min. The mixer is switched off and the mixture is homogenized manually. Finally, the mixer is switched back on at high speed for 2 min (120 rpm)

The workability and the density of these fresh mortars are measured, along with the mechanical properties obtained. The results are as follows:

| | |
|---|---|
| workability: | 40% |
| density: | 2.02 |
| occluded air: | 14% |

The mechanical properties are collated in Table 1:

TABLE 1

|  | 1 day | 7 days | 28 days |
| --- | --- | --- | --- |
| Compression strength (MPa) | 32.2 | 38.7 | 41.1 |
| Flexural strength (MPa) | 7.1 | 7.1 | 7.9 |
| Modulus of elasticity (GPa) | 30 | 31 | 35 |

The capillary absorption as a function of time changes in the following way:

TABLE 2

| Time | Absorption Δm (g) |
| --- | --- |
| 1 hour | 0.75 |
| 2 hours | 1.05 |
| 24 hours | 1.9 |

Example 2

Phosphomagnesium Mortar Comprising a Latex

A mortar is prepared according to the procedure of Example 1, except that a polymer is introduced with the dry materials, in a proportion of 20% by weight, expressed as solids, relative to the binding phase.

Several water-redispersible polymer powders are tested:
1—a vinyl acetate/mixed vinyl vester copolymer powder,
2—a powder of styrene/butadiene copolymer and of a carboxylic acid.

The characteristics of the mortars obtained are collated in Table 3.

TABLE 3

|  | Polymer | |
| --- | --- | --- |
|  | 1 | 2 |
| Workability (%) |  | 30 |
| Density | 1.98 | 1.62 |
| Occluded air (%) |  | 21 |
| Compression strength (MPa) | | |
| 1 day |  | 15.3 |
| 7 days | 36.7 | 23.3 |
| 28 days |  | 25 |
| Flexural strength (MPa) | | |
| 1 day |  | 4.6 |
| 7 days | 7.5 | 7.1 |
| 28 days |  | 7.8 |
| Modulus of elasticity (GPa) | | |
| 1 day | 22.5 | 17.3 |
| 7 days | 24 | 20 |

It is observed that the presence of the polymer powders in the mortar makes it possible to lower the modulus of elasticity compared with the standard mortar of Example 1. However, strong entrainment of air into the mortar during mixing is also observed, which leads to a porous final product of low density.

The water-repellency properties were controlled on a mortar produced according to the procedure of Example 1, except that a polymer powder is introduced with the dry materials, in a proportion of 2% by weight, expressed as solids, relative to the binding phase.

The polymer powder tested is the powder of styrene/butadiene copolymer and of carboxylic acid (2).

Capillary adsorption measurements are collated in Table 4.

TABLE 4

| Time | Absorption Δm (g) |
| --- | --- |
| 1 hour | 0.1 |
| 2 hours | 1.75 |
| 24 hours | 0.19 |

It is observed that the addition of a small amount of the polymer 2 strongly decreased the capillary absorption.

Example 3

Phosphomagnesium Mortar Comprising a Latex and an Aminoalkylsilane

A mortar is prepared according to the procedure of Example 1, except that the polymer powder 2 defined in Example 2 is introduced with the dry materials, in a proportion of 20% by weight, expressed as solids, relative to the binding phase, and γ-aminopropyltriethoxysilane is introduced in a proportion of 1% by weight relative to the binding phase.

Workability and density of the mortar are measured, as well as the mechanical properties obtained. The results are as follows:

| workability: | 50% |
| --- | --- |
| density: | 1.80 |
| occluded air: | 11% |

The mechanical properties are collated in Table 5:

TABLE 5

|  | 1 day | 7 days | 28 days |
| --- | --- | --- | --- |
| Compression strength (MPa) | 13.5 | 29 | 31 |
| Flexural strength (MPa) | 4.5 | 8 | 8.5 |
| Modulus of elasticity (GPa) | 17.5 | 21 | 22 |

The presence of the aminosilane allows the mortar to conserve a high density and correct mechanical performance.

The water-repellency properties were controlled on a mortar produced according to the procedure of Example 1, except that a polymer powder is introduced with the dry materials, in a proportion of 2% by weight, expressed as solids, relative to the binding phase, and γ-aminopropyltriethoxysilane is introduced in a proportion of 1% by weight relative to the binding phase.

The polymer powder is the powder of styrene/butadiene copolymer and of carboxylic acid (2).

The capillary adsorption measurements are collated in Table 6.

TABLE 6

| Time | Absorption Δm (g) |
|---|---|
| 1 hour | 0.075 |
| 2 hours | 0.125 |
| 24 hours | 0.15 |

It is observed that the combined action of a small amount of the polymer 2 and of the aminoalkylsilane reduced the capillary absorption further.

What is claimed is:

1. Phosphomagnesium cement, obtained by placing a binding phase, based on at least one phosphorous compound and at least one magnesium compound, in contact with at least one polymer in the form of water-insoluble particles, and water, wherein the polymer is obtained from the polymerization of at least one monomer containing ethylenic unsaturation and at least one monomer selected from the group consisting of carboxylic function containing monomers, acrylamide monomers or methacrylamide monomers.

2. Cement according to claim 1, wherein the monomer containing ethylenic unsaturation comprises styrene, butadiene, acrylic or methacrylic esters of $C_1$–$C_{12}$ alkyl or their corresponding acids, or vinyl esters.

3. Cement according to claim 1, wherein the monomer containing a carboxylic function comprises carboxylic acids containing ethylenic unsaturation.

4. Cement according to claim 3, wherein the monomer containing a carboxylic function is selected from the group consisting of acrylic acid, itaconic acid, fumaric acid, crotonic acid, maleic acid, maleic anhydride, mesaconic acid, glutaconic acid and mixtures thereof.

5. Cement according to claim 1, wherein the polymer in the form of water-insoluble particles is prepared from a mixture of monomers containing 99.9 to 92% by weight of at least one monomer containing ethylenic unsaturation and 0.1 to 8% by weight of at least one monomer containing a carboxylic function.

6. Cement according to claim 1, wherein the polymer in the form of water-insoluble particles is obtained from the polymerization of at least one monomer comprising vinyl esters of carboxylic acids.

7. Cement according to claim 1, wherein the polymer in the form of water-insoluble particles is in the form of a dispersion of polymer particles in water.

8. Cement according to claim 1, wherein the polymer in the form of water-insoluble particles is in the form of a powder which can be redispersed in water.

9. Cement according to claim 1, wherein the content of polymer in the form of water-insoluble particles is from 0.5 to 30 parts by weight per 100 parts by weight of binding phase.

10. Cement according to claim 1, which can be obtained by placing the binding phase in contact with at least one polymer in the form of water-insoluble particles and at least one aminoalkylsilane, and water.

11. Cement according to claim 10, wherein the aminoalkylsilane is an aminoalkyl (alkoxysilane).

12. Cement according to claim 10, wherein the aminoalkylsilane is chosen from those of formula: $R^1R^2N$—$(CH_2)_n$—$Si(OC_mH_{2m+1})_3$ with:

n>1 m>1

$R^1$ and $R^2$ being alkyl, aryl, alkylaryl, alkylene or aminoalkyl groups.

13. Cement according to claim 10, wherein the aminosilane comprises γ-aminopropyltriethoxysilane, 4-aminobutyltriethoxysilane, (aminoethylaminomethyl)phenethyltrimethoxysilane, N-(2-aminoethyl-3-aminopropyl) trimethoxysilane or, ω-aminoundecyltrimethoxysilane.

14. Cement according to claim 10, wherein the aminoalkylsilane content is from 0.005 to 2 parts by weight per 100 parts by weight of binding phase.

15. Cement according to claim 1, comprising a defoaming agent.

16. Cement according to claim 1, comprising granulates.

17. Cement according to claim 16, wherein the content of granulates is not more than 1000 parts by weight relative to 100 parts by weight of binding phase.

18. Cement according to claim 1, wherein the water content is less than 50% by weight relative to the weight of the binding phase.

19. Cement according to claim 18, wherein it can be obtained by mixing the binding phase, the polymer, optionally the aminosilane, water, and at least one inorganic compound introduced in the form:

either of particles (1) less than 0.1 μm in size, or of aggregates (2) less than 0.1 μm in size, or of agglomerates (3) which can at least partially disintegrate, during mixing of the said binding phase and water, into particles less than 0.1 μm in size or into aggregates less than 0.1 μm in size.

20. Phosphomagnesium cement according to claim 19, wherein the inorganic compound is silica.

21. Process for preparing the phosphomagnesium cement according to claim 1, wherein the phosphorus and magnesium compounds, at least one polymer in the form of water-insoluble particles, optionally at least one aminoalkylsilane, and water are mixed.

22. Process according to claim 21, wherein the phosphorus and magnesium compounds are mixed, at least one polymer in the form of water-insoluble particles is then added, and then water and optionally at least one aminoalkylsilane are added.

* * * * *